US008687901B2

(12) United States Patent
Inose

(10) Patent No.: US 8,687,901 B2
(45) Date of Patent: Apr. 1, 2014

(54) INFORMATION PROCESSING SYSTEM, INFORMATION PROCESSING APPARATUS, PROCESSING METHOD THEREOF, AND NON-TRANSITORY COMPUTER-READABLE STORAGE MEDIUM

(75) Inventor: Tsutomu Inose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 13/023,863

(22) Filed: Feb. 9, 2011

(65) Prior Publication Data

US 2011/0211728 A1 Sep. 1, 2011

(30) Foreign Application Priority Data

Feb. 26, 2010 (JP) ................................. 2010-043066

(51) Int. Cl.
*G06K 9/72* (2006.01)
(52) U.S. Cl.
USPC ............ 382/229; 382/218; 382/190; 382/118; 382/224; 382/100; 382/124; 382/125; 382/305
(58) Field of Classification Search
CPC ................................ G06K 9/2054; G06K 9/46
USPC ......... 382/229, 218, 190, 118, 224, 100, 124, 382/125, 305
See application file for complete search history.

(56) References Cited

U.S. PATENT DOCUMENTS

| 8,307,046 | B2 * | 11/2012 | Ortiz et al. ..................... 709/217 |
| 8,325,999 | B2 * | 12/2012 | Kapoor et al. ................ 382/118 |
| 2002/0055955 | A1 * | 5/2002 | Lloyd-Jones et al. ......... 707/512 |
| 2003/0236831 | A1 | 12/2003 | Ortiz et al. ..................... 709/204 |
| 2004/0260625 | A1 | 12/2004 | Usami et al. ..................... 705/26 |
| 2010/0008547 | A1 | 1/2010 | Yagnik et al. ................. 382/118 |

FOREIGN PATENT DOCUMENTS

| CN | 1777916 A | 5/2006 |
| JP | 2002-055748 | 2/2002 |
| JP | 2005-012649 | 1/2005 |
| JP | 2006-59063 A | 3/2006 |
| JP | 2008-139948 A | 6/2008 |

* cited by examiner

*Primary Examiner* — Mike Rahmjoo
(74) *Attorney, Agent, or Firm* — Fitzpatrick, Cella, Harper & Scinto

(57) ABSTRACT

An information processing system assigns a comment to a specific region of an image, and calculates a total value of evaluation scores based on assigned comments for each image as an evaluation value of that image.

11 Claims, 9 Drawing Sheets

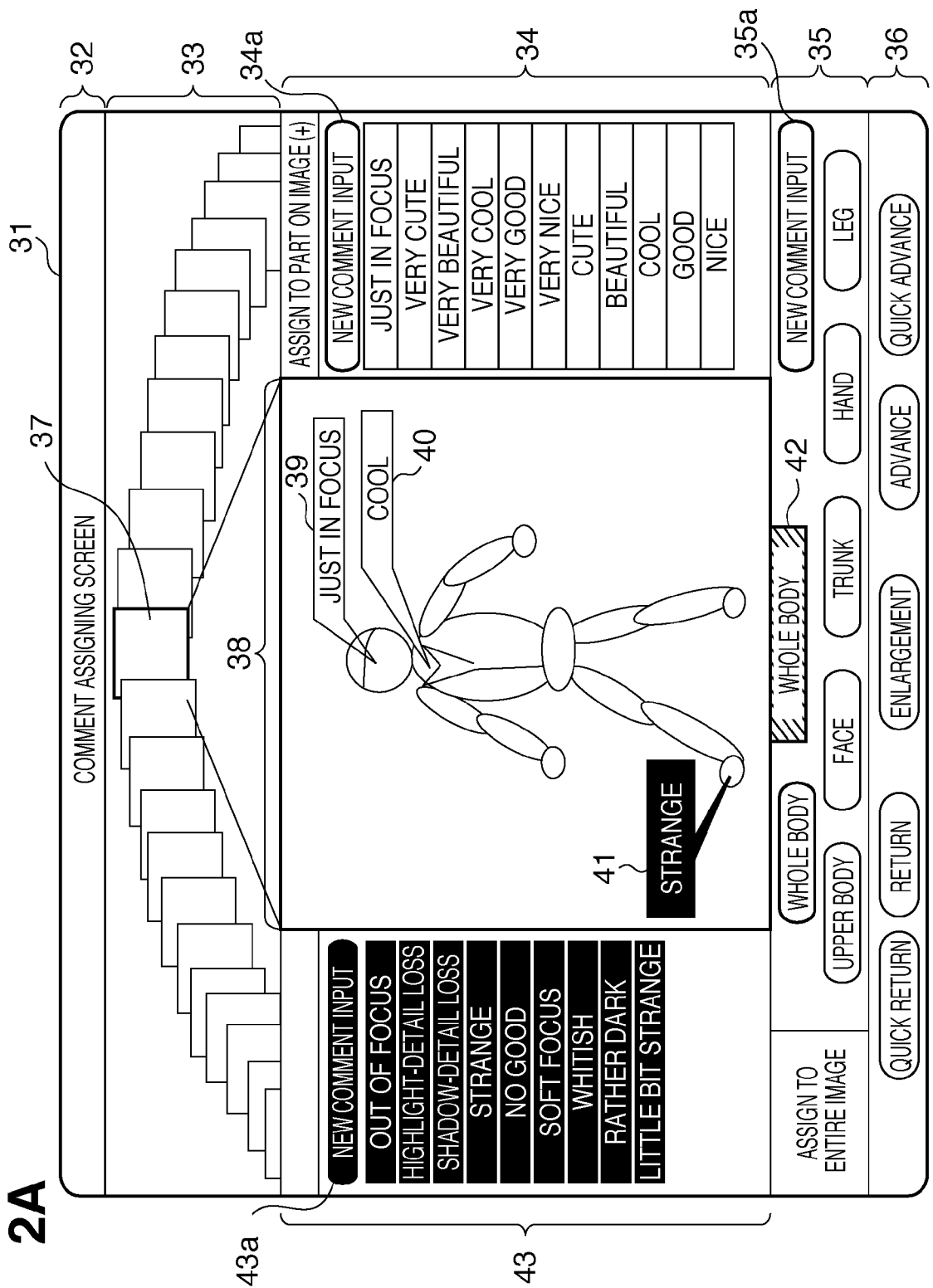

INFORMATION PROCESSING SYSTEM, INFORMATION PROCESSING APPARATUS, PROCESSING METHOD THEREOF, AND NON-TRANSITORY COMPUTER-READABLE STORAGE MEDIUM

BACKGROUND OF THE INVENTION

1. Field of the Invention

The present invention relates to an information processing system, information processing apparatus, processing method thereof, and non-transitory computer-readable storage medium.

2. Description of the Related Art

In general, when images are shot in, for example, a studio, and a customer orders shot images to be printed on, for example, a photo book, the customer and a staff member in the studio interactively select images to be purchased from shot images, and decide a layout of the images, thus making order processing of the photo book. Such operations are made to introduce a commodity such as a photo book, to confirm and recommend shot images, and to create a photo book using the shot images.

However, these operations require much time. Hence, the following system is known. In this system, shot images are registered in a server on the Internet, and a customer browses the shot images from his or her PC via, for example, a Web to order to create a photo book.

In this system, the customer selects a commodity, selects images to be purchased, and decides a layout of the selected image at his or her decision (Japanese Patent Laid-Open No. 2005-012649). Also, a technique for dragging and dropping, for example, an icon associated with metadata (name, etc.) on an image to assign the metadata to the dropped position is known (Japanese Patent Laid-Open No. 2002-055748). This technique allows an image region (face part, person part) to be extracted and to conduct a search using assigned metadata.

However, in this case, the customer has to browse many shot images without any advice from an expert staff member, and select appropriate images from them. For this reason, the customer may often not appropriately select images.

SUMMARY OF THE INVENTION

The present invention provides a technique which improves operation efficiency while maintaining high selection precision for selection of images.

According to a first aspect of the present invention there is provided an information processing system comprising: an assigning unit configured to assign a comment to a specific region of an image; and an evaluation unit configured to calculate a total value of evaluation scores based on comments assigned by the assigning unit for each image as an evaluation value of that image.

According to a second aspect of the present invention there is provided an information processing apparatus comprising: an assigning unit configured to assign a comment to a specific region of an image; and an evaluation unit configured to calculate a total value of evaluation scores based on comments assigned by the assigning unit for each image as an evaluation value of that image.

According to a third aspect of the present invention there is provided a processing method of an information processing system, comprising: assigning a comment to a specific region of an image; and calculating a total value of evaluation scores based on assigned comments for each image as an evaluation value of that image.

According to a fourth aspect of the present invention there is provided a non-transitory computer-readable storage medium storing a computer program, which controls a computer to function as: an assigning unit configured to assign a comment to a specific region of an image; and an evaluation unit configured to calculate a total value of evaluation scores based on comments assigned by the assigning unit for each image as an evaluation value of that image.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are views showing examples of screens used upon comment assignment;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
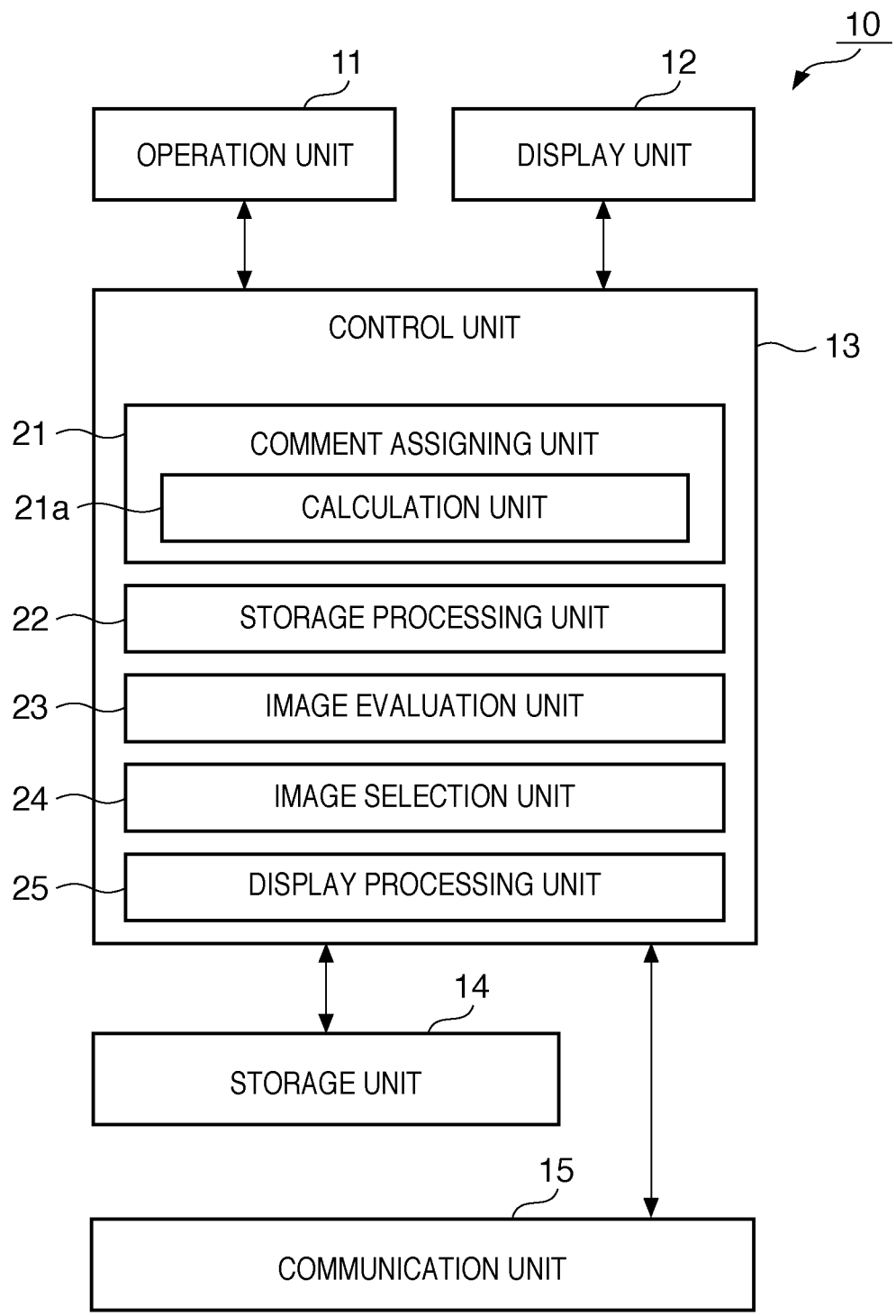
FIG. 1 is a block diagram showing an example of the arrangement of an information processing apparatus according to an embodiment of the present invention.

FIG. 1 is a block diagram showing an example of the arrangement of an information processing apparatus according to an embodiment of the present invention.

An information processing apparatus 10 includes, as its functional arrangement, an operation unit 11, display unit 12, control unit 13, storage unit 14, and communication unit 15.

The operation unit 11 is implemented by, for example, a keyboard and pointing device (for example, a mouse or pen), and inputs various instructions from the user to the apparatus. The display unit 12 is implemented by, for example, a display, and outputs various kinds of information to the user.

The control unit 13 is implemented by a CPU (Central Processing Unit) and memories such as a ROM (Read Only Memory) and RAM (Random Access Memory). The control unit 13 systematically controls the processing in the information processing apparatus 10. That is, various kinds of processing in the information processing apparatus 10 are implemented when the CPU reads out and executes programs stored in the storage unit 14 using the memory as a work area.

The storage unit 14 is implemented by, for example, an HDD (Hard Disk Drive), and stores various data. The storage unit 14 stores various programs (for example, an operating system and applications).

The communication unit 15 is implemented by, for example, a network card or USB (Universal Serial Bus) card, and controls communications between the information processing apparatus 10 and other apparatuses. The various processing functions which configure the information processing apparatus 10 have been described. Note that the information processing apparatus 10 may be set in an environment connected to, for example, a network, or an environment in which it operates by itself (standalone).

An example of the functional arrangement implemented by the control unit 13 will be described below.

The control unit 13 includes, as its functional arrangement, a comment assigning unit 21, storage processing unit 22, image evaluation unit 23, image selection unit 24, and display processing unit 25. These processing functions are implemented, for example, when the CPU reads out and executes programs stored in the storage unit 14 using the memory as a work area.

The comment assigning unit 21 assigns a comment to an image. A comment is assigned to an image (entire image) and also to a specific region of an image. The comment assigning unit 21 assigns a comment based on a user instruction input via the operation unit 11. Note that a comment may be assigned to only a specific region of an image.

In this case, the comment assigning unit 21 includes a calculation unit 21a for calculating an evaluation score of a comment. When an evaluation score is not set for a comment at the time of comment assignment, the calculation unit 21a evaluates the contents of the comment using, for example, a natural language processing technique, and calculates an evaluation score of that comment based on the evaluation result. Note that the evaluation score is obtained by numerically converting an evaluation for an image assigned with the comment or an image in a specific region (for example, a specific part of an object) assigned with the comment. As will be described in detail later, the evaluation score is set to be a value designated by the user or its value is automatically decided by the apparatus side.

The storage processing unit 22 stores information associated with a comment assigned by the comment assigning unit 21 (to be referred to as comment information hereinafter) and an image in the storage unit 14 in association with each other. The comment information includes, for example, the contents and evaluation score of the comment and its position information. The position information corresponds to coordinates indicating a position when a comment is assigned to a specific region of an image, or information such as "entire image" when a comment is assigned to an image (entire image). Note that the comment information may be held in a metadata area defined in an image file or it may be held as metadata independent of an image.

The image evaluation unit 23 evaluates comments assigned to an image (entire image) and specific regions of the image. More specifically, the image evaluation unit 23 calculates, as an evaluation value (total evaluation score) of an image, a value obtained by adding up, for each image, evaluations (evaluation scores) of one or a plurality of comments assigned to the image.

The image selection unit 24 selects images based on the image evaluation results by the image evaluation unit 23.

More specifically, the image selection unit 24 selects images whose evaluation values calculated by the image evaluation unit 23 satisfy a predetermined condition. As an image selection method, for example, a method of selecting the predetermined number of images in turn from those which have higher evaluation values may be used. Alternatively, a method of selecting images whose evaluation values are higher than a certain value may be used. Note that images selected by the image selection unit 24 are laid out on a photo book or are displayed as layout candidate images on the photo book upon creation of the photo book. Furthermore, the selected images may be used in a slideshow in a photo frame or a screen saver of a PC.

The display processing unit 25 controls the display unit 12 to display various screens. For example, the display processing unit 25 lays out, for example, images assigned with comments on a screen, and executes display control of these images. The functional arrangement in the information processing apparatus 10 has been described.

Figure 2B:
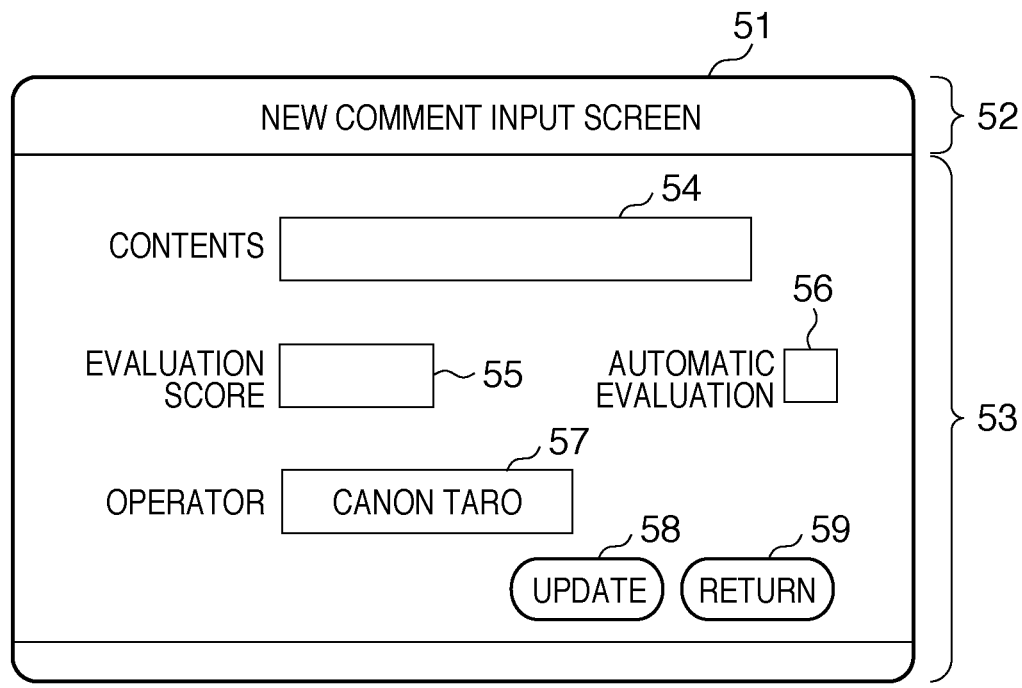

Screens used upon comment assignment will be described below. As screens to be displayed on the display unit 12 upon comment assignment, FIG. 2A shows a comment assigning screen, and FIG. 2B shows a new comment input screen.

The comment assigning screen 31 includes a title area 32, thumbnail area 33, image area 38, first operation area 34, second operation area 43, third operation area 35, and fourth operation area 36.

On the title area 32, a title is displayed. In case of FIG. 2A, a title "comment assigning screen" is displayed. On the thumbnail area 33, images as comment assignment targets are displayed in the thumbnail format. On the thumbnail area 33, thumbnail images are displayed in a chronological order of shooting dates from the left side (older) to the right side (newer) in FIG. 2A. An image 37 located at the center of the thumbnail area 33 is an image which is currently being processed, and the image which is being processed is displayed on the image area 38 in an enlarged scale.

The first operation area 34 includes a plurality of icons (buttons) used to assign a plus evaluation comment to a specific region of an image which is being displayed on the image area 38. These icons are used when a plus evaluation comment is assigned to a specific region of an image which is being displayed on the image area 38. In case of FIG. 2A, the plus evaluation comment icons include, for example, "just in focus", "very cute", "very beautiful", "very cool", "very good", "very nice", "cute", "beautiful", "cool", "good", and "nice".

The second operation area 43 includes a plurality of icons (buttons) used to assign a minus evaluation comment to a specific region of an image which is being displayed on the image area 38. These icons are used when a minus evaluation comment is assigned to a specific region of an image which is being displayed on the image area 38. In case of FIG. 2A, the minus evaluation comment icons include, for example, "out of focus", "highlight-detail loss", "shadow-detail loss", "strange", "no good", "soft focus", "whitish", "rather dark", and "little bit strange".

The third operation area 35 includes a plurality of buttons used to assign a comment to an image (entire image) which is being displayed on the image area 38. These buttons are used when a comment is assigned to an image (entire image) which is being displayed on the image area 38. In case of FIG. 2A, the comment buttons include, for example, "whole body", "upper body", "face", "trunk", "hand", and "leg". For example, "whole body" is a comment indicating that an image is a whole body shot, and "upper body" is a comment indicating that an image is an upper body shot.

In this case, as shown in FIG. 2A, comments 39 to 42 are assigned to respective parts of an image which is being displayed on the image area 38. Of these comments 39 to 42, the comments 39 to 41 are those which are assigned to specific regions, and the comment 42 is that which is assigned to the image (entire image).

Upon assigning a comment to a specific region, the user drags and drops an icon included in the first and second operation areas 34 and 43 to a specific region in an image which is being displayed on the image area 38 using the operation unit 11 (for example, a mouse). Then, the user can assign a comment to a desired part.

Upon assigning a comment to an image (entire image), the user need not specify any position on the image. For this reason, the user turns on/off a button included in the third operation area 35 using the operation unit 11 (for example, a mouse) in place of the drag-and-drop operation. Then, the user can assign a comment to the image.

The comments assigned to the specific regions in this way are displayed as the comments 39 to 41, and the comment assigned to the image (entire image) is displayed as the comment 42. In case of FIG. 2A, the comments 39 to 42 are displayed above and below an object so as not to overlap the object.

That is, when a comment is displayed intact at the drag-and-drop position, an object part displayed on the dropped region may be disturbed. For this reason, the comment contents themselves are not displayed on the dropped region, but are displayed on a region different from that position while indicating the dropped position by "speech balloon" or "arrow". Note that the processing for displaying comment contents at a position kept away from a dropped region and an object included in the dropped region may be manually done by the user, or the dropped region may be automatically kept away by automatically recognizing the object by the information processing apparatus 10 (control unit 13).

In this case, the comments 39 and 40 are plus evaluation comments, and the comment 41 is a minus evaluation comment. For example, the comment 39 is assigned to a face of the object (a person in this case), and indicates a plus evaluation comment "just in focus". The comment 40 is assigned to a chest of the object (the person in this case), and indicates plus evaluation comment "cool". The comment 41 is assigned to a right leg of the object (the person in this case), and indicates a minus evaluation comment "strange". Note that when the user wants to delete a comment assigned to a specific region, he or she need only select that comment using the operation unit 11 (for example, a mouse), and then press a "Delete" key of the operation unit 11 (for example, a keyboard). Then, the comment is deleted.

The comment 42 is assigned to the image (entire image), and indicates a comment "whole body". The comment 42 is assigned using a button included in the third operation area 35. In this case, the button (included in the third operation area 35) used to assign the comment is displayed in a shape different from other buttons (for example, by highlighting a frame of that button) so that the user can identify the state of that button. Note that when the user wants to delete a comment assigned to the image (entire image), he or she need only press that button again using the operation unit 11 (for example, a mouse).

The fourth operation area 36 includes a plurality of buttons used to operate thumbnail images which are being displayed on the thumbnail area 33. In case of FIG. 2A, the buttons used to operate thumbnail images include, for example, "quick return", "return", "enlargement", "advance", and "quick advance".

The "quick return" and "return" buttons are used to instruct to move thumbnail images, which are being displayed on the thumbnail area 33, from the left side (older) to the right side (newer). That is, the image 37 is switched to an image having an older shooting date. A difference between "quick return" and "return" is a moving speed, and upon pressing of the "quick return" button, the image 37 is switched quicker than upon pressing of the "return" button.

The "quick advance" and "advance" buttons are used to instruct to move thumbnail images, which are being displayed on the thumbnail area 33, from the right side (newer) to the left side (older). That is, the image 37 is switched to an image having a newer shooting date. A difference between "quick advance" and "advance" is a moving speed, and upon pressing of the "quick advance" button, the image 37 is switched quicker than upon pressing of the "advance" button.

The "enlargement" button is used to further enlarge an image which is being displayed on the image area 38. Upon pressing of the "enlargement" button, the user can check an image in detail, and can control a position more accurately upon assigning a comment to a specific region of the image.

The first, second, and third operation areas 34, 43, and 35 includes "new comment input" buttons 34a, 43a, and 35a in addition to the aforementioned buttons and icons. The "new comment input" button is used to create a new comment other than the existing comments. When the user presses this button using the operation unit 11 (for example, a mouse), a new comment input screen 51 shown in FIG. 2B is displayed.

The new comment input screen 51 includes a title area 52 and display operation area 53. The display operation area 53 includes two input fields 54 and 55, a check box 56, an output field 57, and two buttons 58 and 59.

To the input field 54, comment contents are input. To the input field 55, an evaluation score of the comment contents is input. To the field 54, the contents of a new comment to be created, for example, a word "awesome" are input. To the field 55, an evaluation score corresponding to the comment contents, for example, "2" or "−1" is input.

When the user does not directly input any evaluation score corresponding to the comment contents, and causes the information processing apparatus 10 to automatically determine the evaluation score, he or she checks the check box 56. When the check box 56 is checked, the information processing apparatus 10 (calculation unit 21a) calculates an evaluation score of a comment based on the comment contents input to the input field 54. For example, a natural language processing technique (known technique) can be used in this processing. Note that evaluation of the comment contents is a known technique, and a description thereof will not be given. For example, a reputation search on the Web uses reputation analysis and opinion analysis based on the natural language processing technique, and that technique can be used.

On the output field 57, a user name is displayed. Such field is assured since it is desirable that a newly created comment is included in the first, second, or third operation area 34, 43, or 35 on the comment assigning screen 31 according to its creator. Note that comments may be displayed independently of creators, as a matter of course. When a user name is displayed on the output field 57, for example, user authentication may be executed upon displaying the comment assigning screen 31. Then, the user name is displayed on the output field 57.

Upon completion of inputs to these fields 54 to 56, the user presses the update button 58 using the operation unit 11 (for example, a mouse). Then, creation of a new comment is complete, and the screen to be displayed is switched to the comment assigning screen 31 shown in FIG. 2A. Note that when the user presses the return button 59, a new comment is not created, and the screen to be displayed is returned to the comment assigning screen 31 shown in FIG. 2A.

The screens used upon comment assignment have been described. Note that the present invention is not limited to the aforementioned configurations of the screens, and these screens can be changed as needed. For example, in the description of FIG. 2A, as the comments to be assigned to the image (entire image), comments such as "whole body" and "upper body" which indicate images of part shots have been exemplified. However, the present invention is not limited to this. For example, comments such as "person" and "landscape" may be used. In this embodiment, the comments to be assigned to the image (entire image) can be called neutral evaluation comments without distinctions of plus and minus evaluations. However, the present invention is not limited to this. For example, comments such as "cool" and "cute" may be used.

Image evaluation processing will be described below. A case will be described below with reference to FIG. 3 wherein each of images is evaluated based on a total of evaluation scores of one or a plurality of comments assigned to that image.

Figure 3:
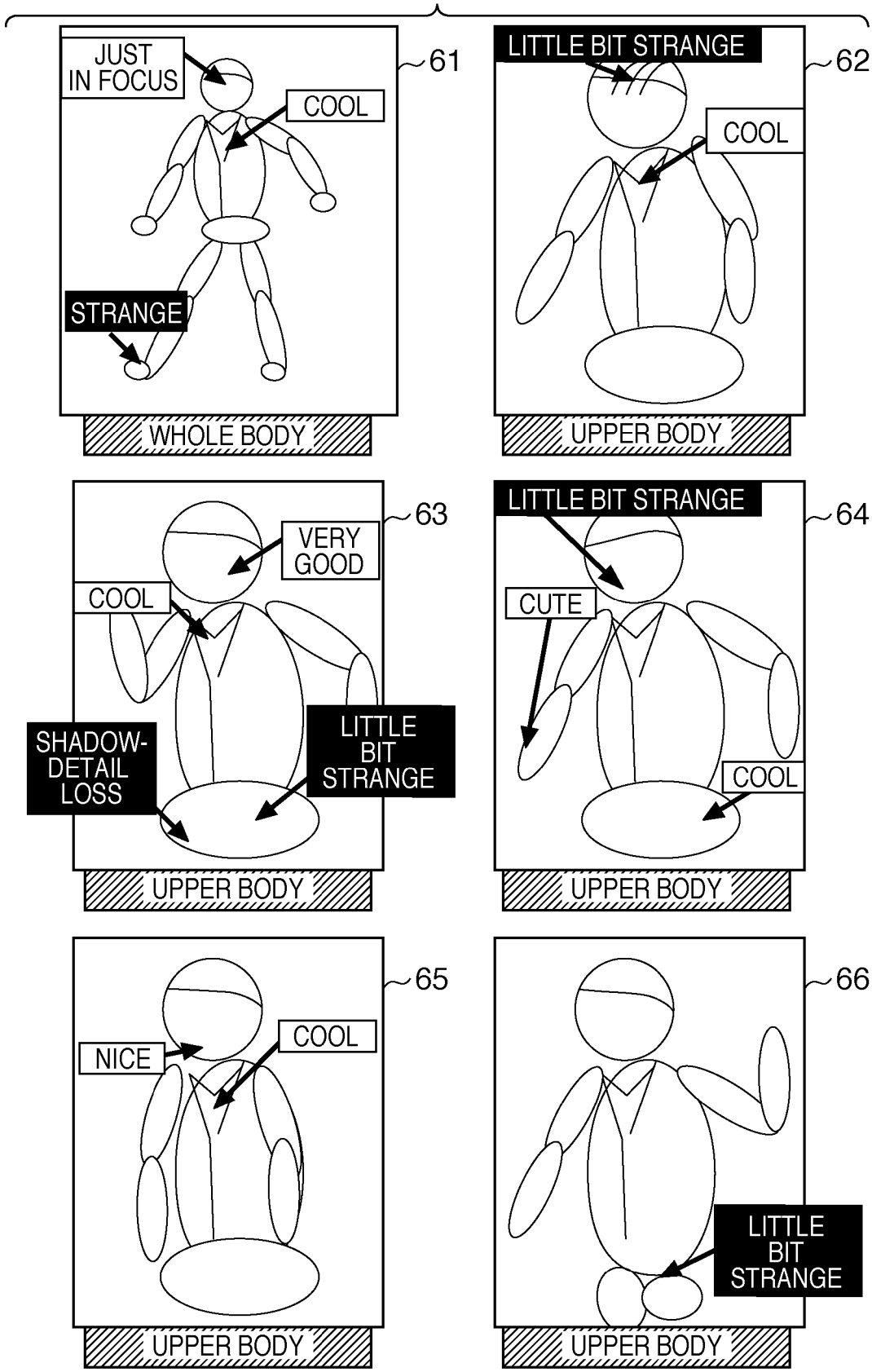
FIG. 3 is a view showing an example of an overview of processing upon evaluation of images.

FIG. 3 shows six images 61 to 66, to which comments are assigned. In this case, a plus evaluation comment is expressed by black letters on a white background, and a minus evaluation comment is expressed by outline letters on a black background. Also, a neutral evaluation comment is expressed by black letters on a hatched background.

For example, to the image 61, plus evaluation comments "just in focus" and "cool" are assigned, a minus evaluation comment "strange" is assigned, and a neutral evaluation comment "whole body" is assigned.

In this embodiment, assume that a plus evaluation comment earns "+1 point", a minus evaluation comment earns "−1 point", and a neutral evaluation comment earns "0 point". This score (evaluation score) is decided by a value input to the input field (evaluation score field) 55 in FIG. 2B or by automatic evaluation, but it need not always assume such value and can be changed as needed.

A total of evaluations (evaluation scores) of one or a plurality of comments assigned to an image is calculated.

Since the image 61 is assigned with two plus evaluation comments and one minus evaluation comment, it earns plus "2 points" and minus "1 point", that is, "+1 point" as a balance total.

Since the image 62 is assigned with one plus evaluation comment and one minus evaluation comment, it earns plus "1 point" and minus "1 point", that is, "0 point" as a balance total.

Since the image 63 is assigned with two plus evaluation comments and two minus evaluation comments, it earns plus "2 points" and minus "2 points", that is, "0 point" as a balance total.

Since the image 64 is assigned with two plus evaluation comments and one minus evaluation comment, it earns plus "2 points" and minus "1 point", that is, "+1 point" as a balance total.

Since the image 65 is assigned with two plus evaluation comments and no minus evaluation comment, it earns plus "2 points", that is, "+2 point" as a balance total.

Since the image 66 is assigned with no plus evaluation comment and one minus evaluation comment, it earns plus "0 point" and minus "1 point", that is, "−1 point" as a balance total. In this manner, totals of evaluation scores of the comments are calculated for respective images, thus evaluating the images.

Figure 4:
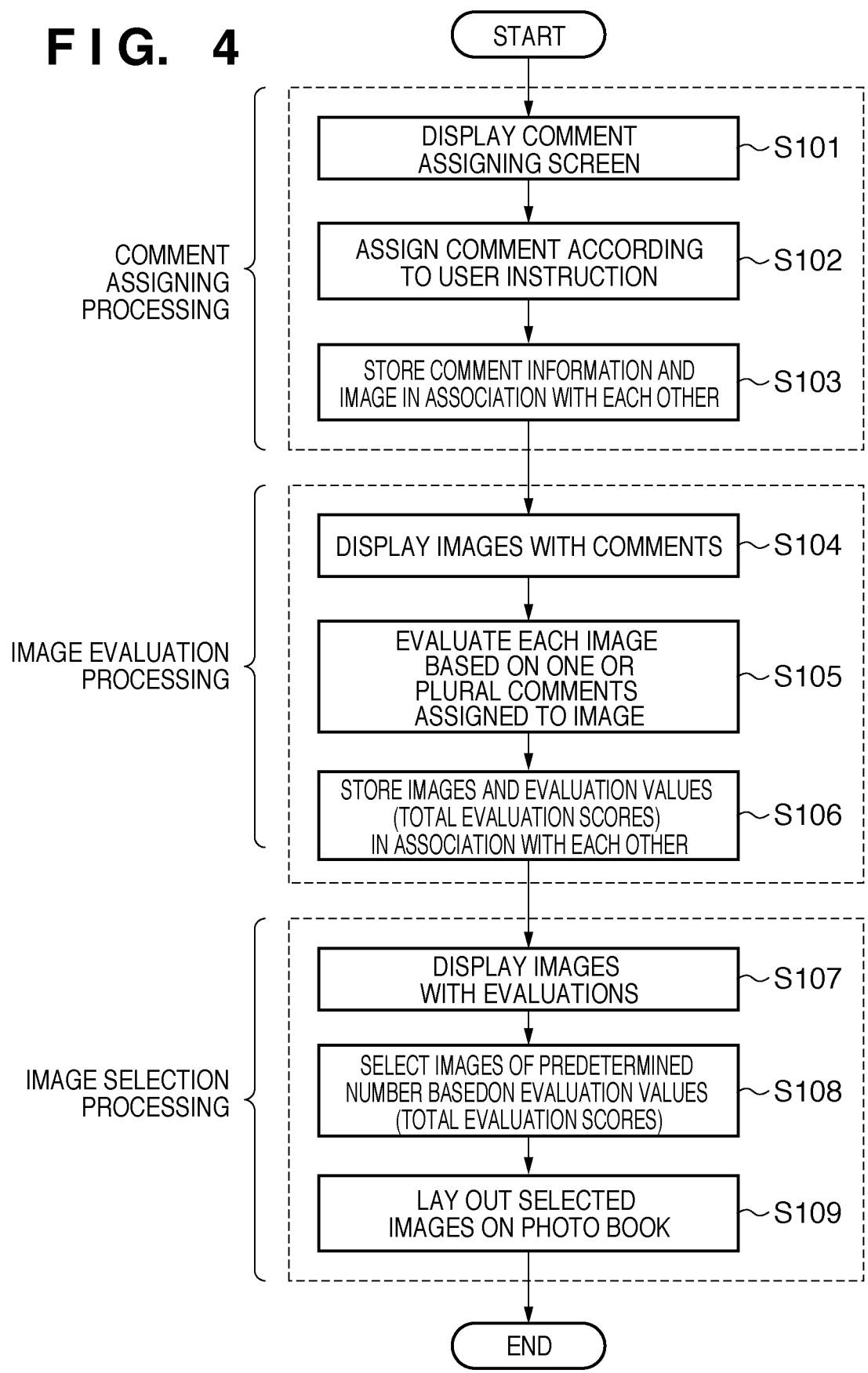
FIG. 4 is a flowchart showing an example of the sequence of processing of an information processing apparatus 10 shown in FIG. 1.

The operation of the information processing apparatus 10 shown in FIG. 1 will be described below with reference to FIG. 4. In this case, the processing of the information processing apparatus 10 can be roughly classified into three types of processing, that is, comment assigning processing, image evaluation processing, and image selection processing.

It is desirable that the comment assigning processing is executed based on, for example, instructions of an expert staff member, and the image evaluation processing and image selection processing are executed based on, for example, instructions of a customer. This is because the customer can evaluate and select images based on comments assigned by the expert staff member in this case.

When this processing starts, the information processing apparatus 10 controls the display processing unit 25 to read out a plurality of images stored in the storage unit 14 and to display the readout images on the display unit 12. Then, for example, the comment assigning screen 31 shown in FIG. 2A is displayed on the display unit 12 (S101).

Next, the user instructs to assign comments to an image (entire image) and specific regions of the image using the operation unit (for example, a mouse) 11. That is, the user assigns comments to the images using the screens described above with reference to FIGS. 2A and 2B. Then, the information processing apparatus 10 controls the comment assigning unit 21 to assign comments to each image (entire image) and specific regions of that image based on the instructions (S102). Note that as for a comment, an evaluation score of which is not set in advance (a comment designated with automatic evaluation), the evaluation score is calculated upon assignment of the comment.

After comment assignment is complete, a user instruction indicating completion of the comment assignment is input via the operation unit 11. Then, the information processing apparatus 10 controls the storage processing unit 22 to store images with comments, each of which is obtained by associating comment information including the comment contents, evaluation score, and position information with a corresponding image, in the storage unit 14 (S103). In this manner, the comment assigning processing ends.

Next, processing for evaluating images based on assigned comments (image evaluation processing) will be described below. This processing is executed after the aforementioned comment assigning processing (S101 to S103) is executed. Note that the image evaluation processing need only be executed after the comment assigning processing. That is, the image evaluation processing may be executed immediately after the comment assigning processing or on another date.

After the image evaluation processing starts, the information processing apparatus 10 controls the display processing unit 25 to read out the images with comments stored in the storage unit 14 and to display them on the display unit 12 (S104). Then, the information processing apparatus 10 controls the image evaluation unit 23 to evaluate the images based on one or a plurality of comments assigned to each image. That is, as described above using FIG. 3, a total of evaluations (evaluation scores) of one or a plurality of comments assigned to each image is calculated for each image as an evaluation value (total evaluation score) of that image.

After the evaluation of the images is complete, the information processing apparatus 10 controls the storage processing unit 22 to store images with evaluations, which are obtained by associating the images with their evaluation values, in the storage unit 14 (S106). As a result, the storage unit 14 stores the images with evaluations.

Next, processing for selecting images evaluated based on comments (image selection processing) will be described below. This processing is executed after the aforementioned image evaluation processing (S104 to S106) is executed. Note that the image selection processing need only be executed after the image evaluation processing. That is, the image selection processing may be executed immediately after the image evaluation processing or on another date.

After the image selection processing starts, the information processing apparatus 10 controls the display processing unit 25 to read out the images with evaluations stored in the storage unit 14 and to display them on the display unit 12 (S107). Then, the information processing apparatus 10 controls the image selection unit 24 to select the predetermined number of images from the plurality of images (the images with evaluations) based on the evaluation values (total evaluation scores) associated with the respective images (S108). This predetermined number may be decided in advance or may be input by the user at the beginning of this processing. For example, when "three" images are selected as the predetermined number, three images are selected in turn from those having higher evaluation values. More specifically, if there are six images shown in FIG. 3, the image 61 earns "1 point", the image 62 earns "0 point", the image 63 earns "0 point", the image 64 earns "1 point", the image 65 earns "2 points", and the image 66 earns "−1 point". For this reason, the images 65, 61, and 64 are selected in this case.

Finally, the information processing apparatus 10 controls the control unit 13 to lay out the selected images on, for example, a template of a photo book (S109). Then, the photo book is completed. Note that the selected images need not always be used in the photo book, as described above.

The example of the operation of the information processing apparatus 10 has been described. However, the sequence of the aforementioned processing is described only for an exemplary purpose, and such processing sequence need not always be adopted. For example, upon execution of the image evaluation processing and image selection processing, images need not always be displayed. That is, the processes in steps S104 and S107 can be omitted.

As described above, according to the first embodiment, a customer can select images by adopting the expert staff member's opinions as comments. For this reason, since the need for the operations required for the expert staff member and customer to interactively check images and to select the required images together can be obviated, the operation efficiency upon image selection can be improved. Since the expert staff member's opinions can be adopted as comments, images can be selected appropriately. That is, according to the first embodiment, the operation efficiency can be improved while maintaining high selection precision upon image selection.

Second Embodiment

The second embodiment will be described below. The second embodiment will explain a case in which a comment evaluation is weighted.

Figure 5:
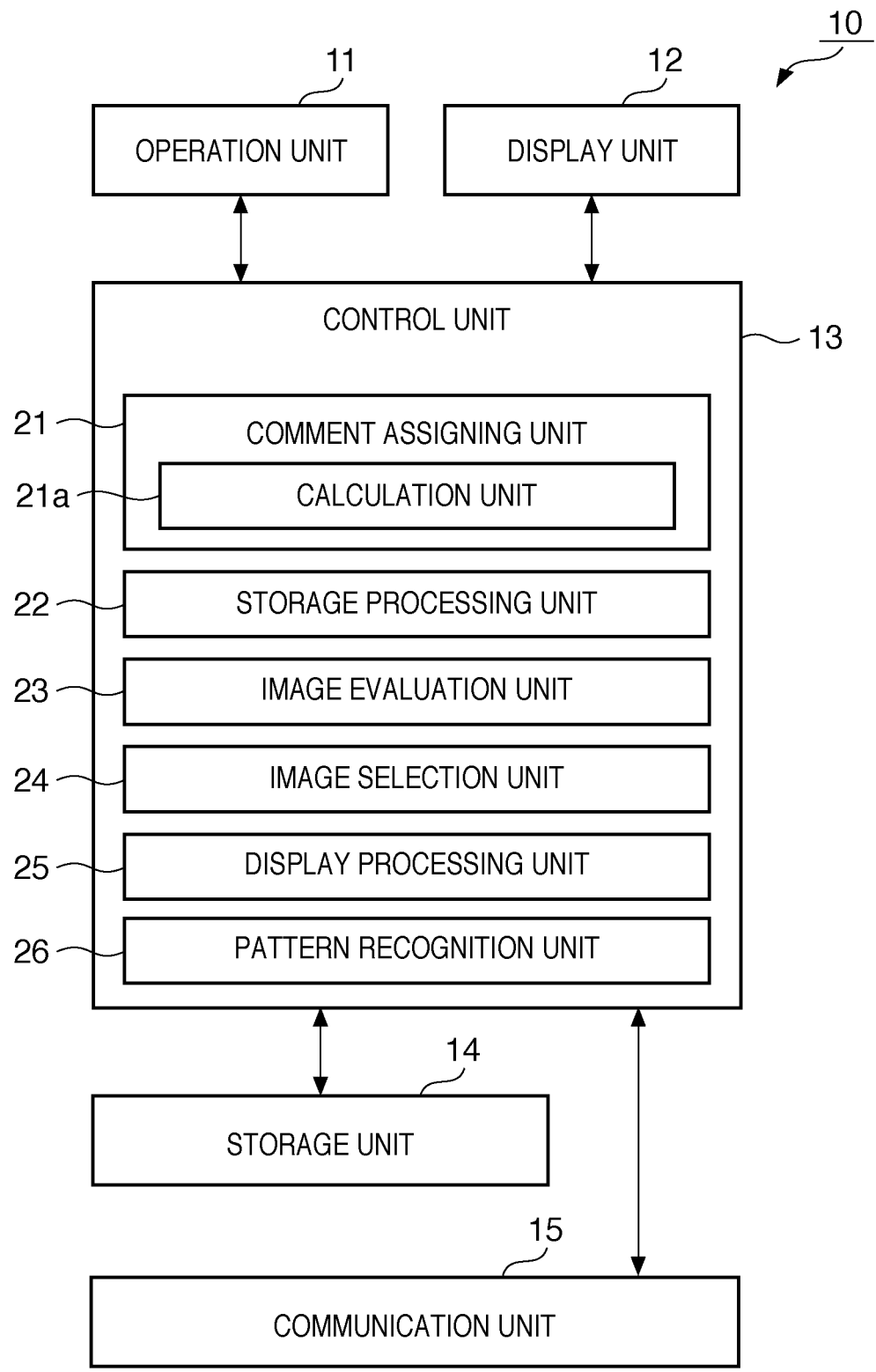
FIG. 5 is a block diagram showing an example of the arrangement of an information processing system according to the second embodiment.

FIG. 5 is a block diagram showing an example of the arrangement of an information processing apparatus 10 according to the second embodiment.

A control unit 13 of the information processing apparatus 10 according to the second embodiment includes a pattern recognition unit 26 in addition to the units of the first embodiment. Note that the remaining units fulfill the same functions as those in FIG. 1 used to explain the first embodiment. For this reason, the following description will be given while focusing on the different arrangement.

The pattern recognition unit 26 executes pattern recognition processing for an image to recognize respective parts of an object. For example, when an object is a person, the pattern recognition unit 26 recognizes parts (face, arms, eyes, etc.) of the person using patterns. Pattern information used in the pattern recognition may be stored in, for example, a storage unit 14.

An image evaluation unit 23 weights comment evaluations based on the recognition result of the pattern recognition unit 26, and evaluates respective images based on the weighted evaluations. More specifically, the image evaluation unit 23 specifies parts in an object to which comments are assigned based on position information indicating positions where comments are assigned, and the recognition result of the pattern recognition unit 26. Then, the image evaluation unit 23 weights evaluation scores of comments according to the specified parts, and calculates a total of the weighted evaluation scores for each image as an evaluation value of that image. To implement this processing, the storage unit 14 stores, for example, weighting information. The weighting information holds respective parts and weights in association with each other. For example, the information for increasing weights for regions of a face and eyes, and decreasing those for other regions is prescribed.

For example, when there is an image as an upper body shot, and even when its arms and shoulders are shot at very good positions, and plus evaluation comments that evaluate them are assigned, if a person is included in that image with eyes closed, an evaluation of that image become impaired considerably. For this reason, evaluation scores of comments are weighted by setting some regions on an image as important regions.

In the description of the second embodiment, comment evaluations are weighted based on the pattern recognition result of the pattern recognition unit 26. However, the pattern recognition unit 26 need not always be included. For example, the user may manually designate important regions (regions with larger weights) at the time of comment assignment.

As described above, according to the second embodiment, all comments are not equivalently evaluated, but they are weighted depending on parts to which comments are assigned. In this case, images can be evaluated more precisely than the first embodiment.

Third Embodiment

The third embodiment will be described below. In the first and second embodiments, processes from comment assignment until image selection are executed using the single information processing apparatus 10. By contrast, the third embodiment will explain a case in which these processes are executed using a plurality of apparatuses.

Figure 6:
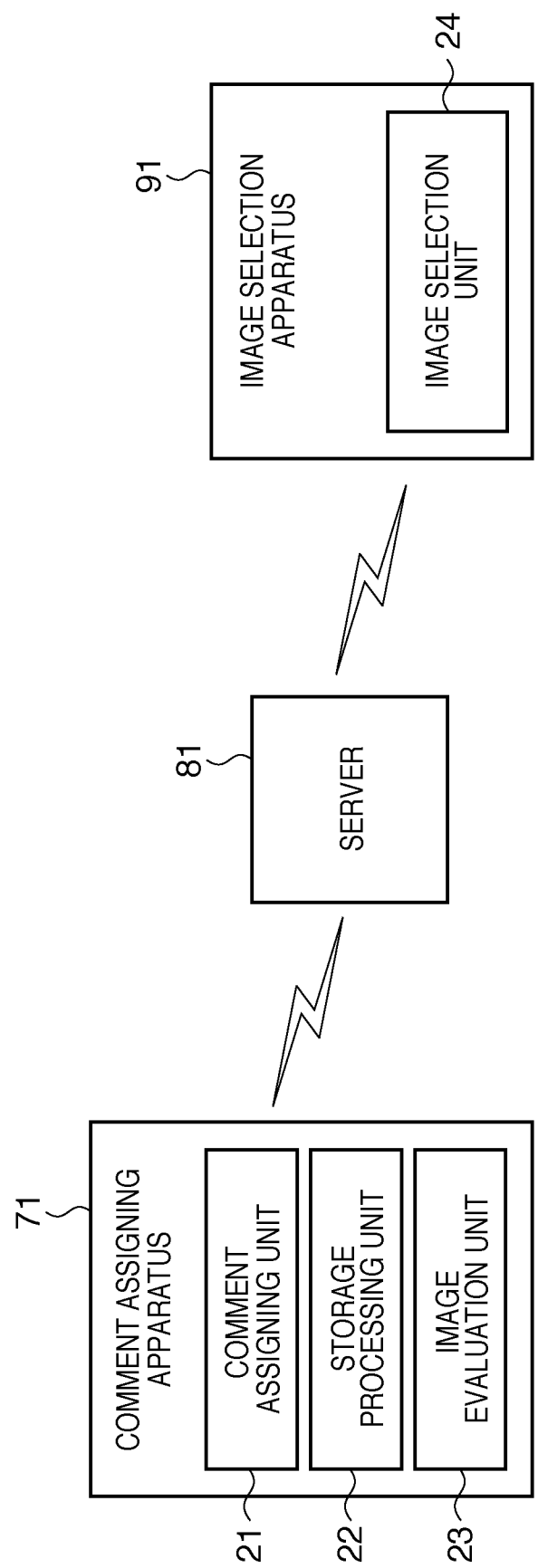
FIG. 6 is a block diagram showing an example of the arrangement of an information processing system according to the third embodiment.

FIG. 6 is a block diagram showing an example of the arrangement of an information processing system according to the third embodiment.

The information processing system includes a comment assigning apparatus 71 which assigns comments, and evaluates images based on the comments, an image selection apparatus 91 which selects images based on evaluations of the images, and a server 81. That is, the functions implemented by the information processing apparatus 10 used to explain the first embodiment are shared by a plurality of terminals. Note that the comment assigning apparatus 71 and image selection apparatus 91 include, for example, an operation unit, display unit, and storage unit as in FIG. 1, but these units are not illustrated for the sake of simplicity.

Between the comment assigning apparatus 71 and image selection apparatus 91, the server 81 is connected via a network such as a LAN (Local Area Network) or WAN (Wide Area Network). The server 81 is connected on, for example, the Internet.

Assume that the comment assigning apparatus 71 is equipped in, for example, a studio, and the image selection apparatus 91 is equipped in, for example, the customer's home. In this case, an expert staff member executes processes from comment assignment until image evaluation at the comment assigning apparatus 71 in the studio, and saves images with evaluations obtained as a result of these processes in the server 81 on the Internet. The customer displays a plurality of images with comments saved in the server 81 using a home PC (image selection apparatus 91), and selects desired images from them. Note that the images with evaluations may not be saved in the server 81 on the Internet, but they may be transmitted from the comment assigning apparatus 71 in the studio to the home image selection apparatus 91 via the Internet. In this case, the image selection apparatus 91 transmits an image acquisition request to the comment assigning apparatus 71.

As described above, according to the third embodiment, the same processing as in the first embodiment is executed by sharing it by a plurality of terminals. That is, the functional arrangement included in the information processing apparatus 10 described in the first embodiment need not always be implemented, as shown in FIG. 1, but all or some of these functions need only be implemented in arbitrary apparatuses in the information processing system.

Fourth Embodiment

The fourth embodiment will be described below. The fourth embodiment will explain an arrangement which allows a plurality of users to evaluate comments from different apparatuses.

Figure 7:
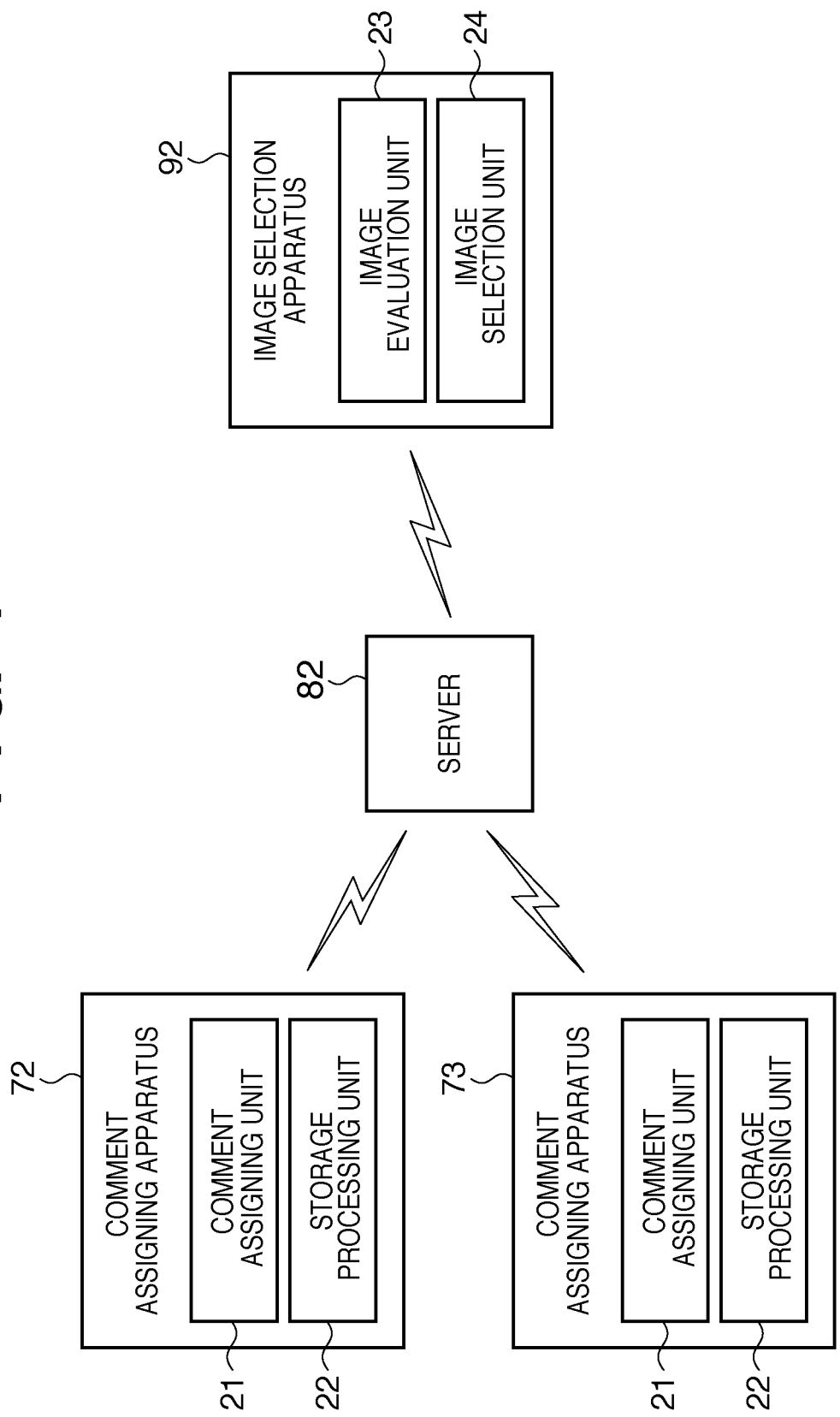
FIG. 7 is a block diagram showing an example of the arrangement of an information processing system according to the fourth embodiment.

FIG. 7 is a block diagram showing an example of the arrangement of an information processing system according to the fourth embodiment.

The information processing system includes a plurality of comment assigning apparatuses 72 and 73 which assign comments, an image selection apparatus 92 which evaluates images based on the assigned comments, and selects images based on the evaluations, and a server 82. That is, in this arrangement, the functions implemented by the information processing apparatus 10 used to explain the first embodiment are shared by a plurality of terminals, and a plurality of terminals are allowed to evaluate comments. Note that the comment assigning apparatuses 72 and 73 and the image selection apparatus 92 also include, for example, an operation unit, display unit, and storage unit as in FIG. 1, but these units are not illustrated for the sake of simplicity.

In this case, assume that the comment assigning apparatus 72 is equipped in, for example, a studio, the comment assigning apparatus 73 is equipped in, for example, the home of a photographer (professional photographer), and the image selection apparatus 92 is equipped in, for example, the customer's home. For example, an expert staff member assigns comments at the comment assigning apparatus 72 in the studio, and saves images with comments in the server 82. Also, the professional photographer further assigns (or deletes) comments to (or from) the images with comments at the comment assigning apparatus 73, and saves images with comments in the server 82. After that, the customer evaluates comments assigned to a plurality of images saved in the server 82 at a home PC (image selection apparatus 92), and selects desired images based on the evaluations.

Figure 8:
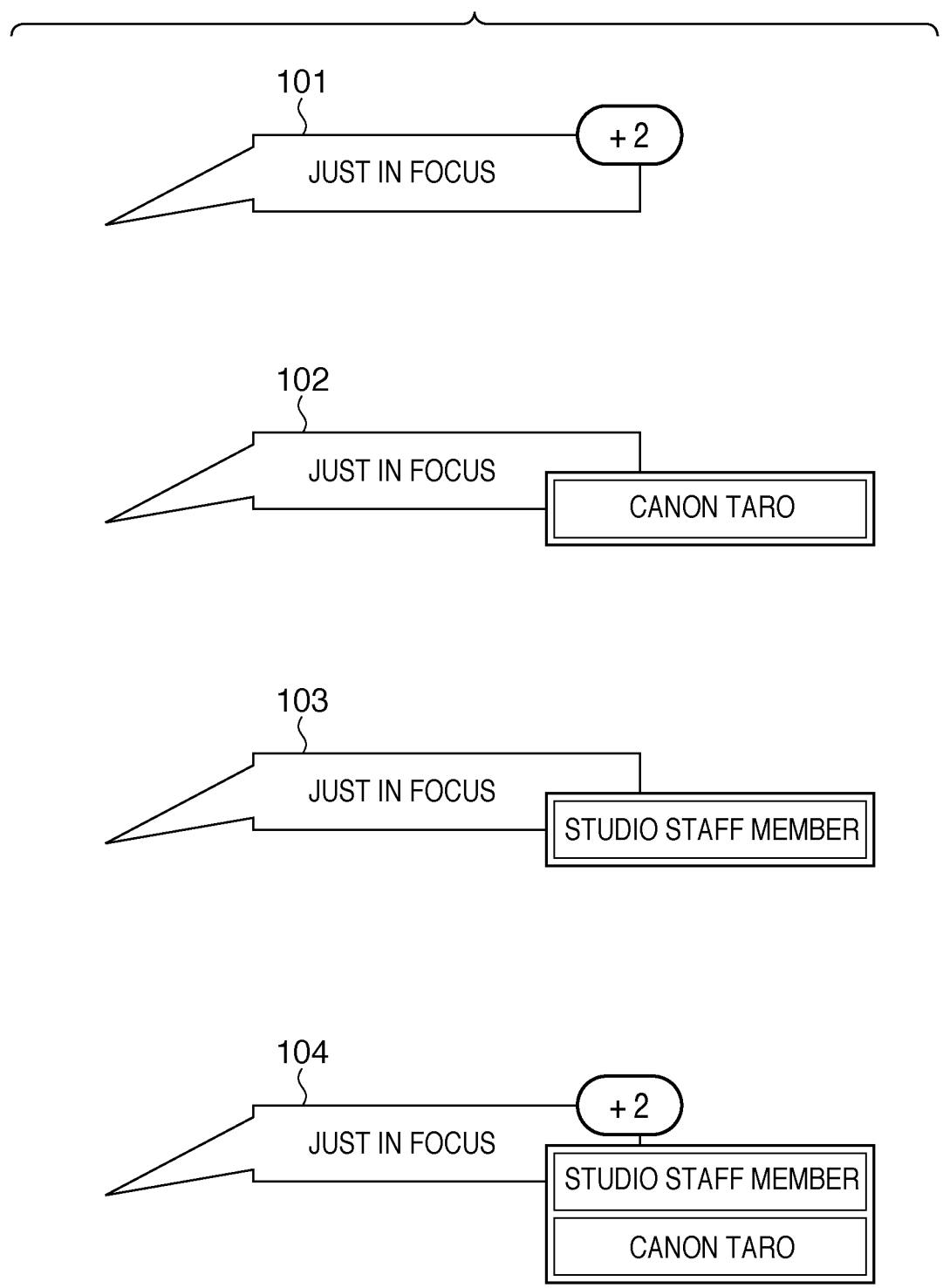
FIG. 8 is a view showing examples of display modes of images with evaluations.

Note that the images with evaluations displayed upon selection of images preferably allow the customer to discriminate users (in this case, the expert staff member and professional photographer) who assigned comments. Four examples of display modes of images with evaluations will be described below with reference to FIG. 8.

On a comment 101, an evaluation score ("+2" in this case) is displayed on the upper right corner of the comment. That is, the comment and its evaluation score are displayed in association with each other.

On a comment 102, a name ("Canon Taro" in this case) of a comment creator is displayed on the lower right corner of the comment. That is, the comment and its creator are displayed in association with each other.

On a comment 103, a role ("studio staff member (expert staff member)" in this case) of a comment creator is displayed on the lower right corner of the comment. That is, the comment and the role of its creator are displayed in association with each other.

On a comment 104, an evaluation score ("+2" in this case) is displayed on the upper right corner of the comment, and a name and role ("studio staff member (expert staff member)" in this case) of a comment creator are displayed on the lower right corner of the comment. That is, the comment and the name and role of its creator are displayed in association with each other.

Upon execution of image evaluation and selection processes, images may be evaluated and selected based on comments of all users who assigned the comments. Alternatively, images may be evaluated and selected based only on comments assigned by a specific user (for example, a professional photographer). That is, when the user designates a comment assigner via an operation unit 11 at the time of, for example, image evaluation, the image selection apparatus 92 may be configured to control an image evaluation unit 23 to evaluate images based only on comment evaluations assigned by the designated comment assigner.

In case of such configuration, for example, the user can create a photo album based on images evaluated by the professional photographer, can then create a photo album based on images evaluated by the expert staff member, and can compare them.

As described above, according to the fourth embodiment, the customer can select images based on comments assigned by a plurality of users (terminals). Note that in the information processing apparatus 10 used to explain the first embodiment as well, comments can be assigned by a plurality of users.

The representative embodiments of the present invention have been exemplified. However, the present invention is not limited to the aforementioned and illustrated embodiments, and allows modifications as needed without departing from the scope of its gist.

Note that the present invention can adopt embodiments in the form of, for example, a system, apparatus, method, program, or storage medium. More specifically, the present invention may be applied to either a system configured by a plurality of devices or an apparatus including a single device.

Some further modifications of the aforementioned embodiments will be described below.

(First Modification)

For example, in the description of the aforementioned embodiments, images of the predetermined number are automatically selected, and are laid out on a photo book. However, the present invention is not limited to this. For example, images having evaluation values equal to or larger than a certain value may be designated as a selection condition, images that satisfy the condition may be displayed as candidate images with comments, and the user may manually select desired images from these candidate images. In this case, the information processing apparatus may be configured to display information indicating the number of images having evaluation values equal to or larger than the certain value on the screen. Such processing can be executed by the display processing unit 25.

(Second Modification)

The information processing apparatus may be configured to display/non-display comments. The apparatus may also be configured to be able to display only plus evaluation comments or only minus evaluation comments. Furthermore, the apparatus may be configured to display images with and without comments to be juxtaposed with each other. Also, comments may be displayed by changing, for example, colors, transparencies, shapes, sizes, icons, and font sizes, type, and shapes based on their evaluation scores. Also, the apparatus may be configured to sort a plurality of candidate images to be displayed in a chronological order or in an order of evaluation values. Such processing can be executed by the display processing unit 25.

(Third Modification)

In the description of the aforementioned embodiments, comments are assigned based on user instructions. However, the present invention is not limited to this, and the comment assigning processing may be automated or semi-automated. For example, the comment assigning unit 21 may automatically determine an in-focus point, highlight-detail loss, shadow-detail loss, and the like, and may assign minus evaluation comments to corresponding positions based on the determination result. After that, the staff member accepts or cancels these comments.

When the comment assigning processing is automated, the number of assigned comments may often become large. For example, the information processing apparatus may be configured to specify important regions using the pattern recognition unit 26 described in the second embodiment, and to automatically assign comments only to the specified regions. When the apparatus is configured to automate or semi-automate the comment assigning processing, the comment assignment efficiency can be improved.

(Fourth Modification)

In the description of the aforementioned embodiments, comments are assigned to images shot in a studio. However, the present invention is not limited to this. For example, the aforementioned processing may be applied to X-ray or MRI shot images in the medical field. For example, an experienced doctor assigns comments to X-ray or MRI shot images. Comment contents can assume information indicating, for example, whether or not an affected part can be clearly recognized, and whether or not an affected part is benign. Also, the pattern recognition unit 26 described in the second embodiment may be used to recognize parts which may cause serious symptoms such as life or sight loss as important regions, and images may be evaluated based on the recognition result.

An inexperienced primary doctor refers to images having higher evaluation values (those which allow the doctor to recognize symptoms well) based on assigned comments, and then efficiently makes diagnoses. When the primary doctor and a patient simultaneously observe images with comments, the doctor can give a diagnosis not only verbally but also visually. In this case, relief and satisfaction can be provided to the patient.

When the present invention is applied to such field, a doctor can give a diagnosis with reference to images with comments assigned by an experienced doctor. For this reason, the diagnosis efficiency at the medical site can be improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-043066 filed on Feb. 26, 2010, which is hereby incorporated by reference herein in its entirety.

What is claimed is:

1. An information processing system comprising:
a processor coupled to a memory and programmed to function as:
an assigning unit that assigns a comment to a region of an image;
an evaluation unit that
rates each of a plurality of comments assigned to different regions of the image by said assigning unit based on contents of each of the plurality of comments, and
rates the image based on the rates of the plurality of comments; and
a display control unit that controls display of the image in relation to each of the plurality of comments.

2. The system according to claim 1,
wherein said evaluation unit evaluates a plurality of images, and
wherein said processor is further programmed to function as a selection unit that selects a first image, in which an evaluation result provided by said evaluation unit satisfies a predetermined condition, from the plurality of images.

3. The system according to claim 2, wherein said selection unit selects images of a predetermined number in turn from the plurality of images having higher evaluation results.

4. The system according to claim 2, wherein said selection unit selects images having evaluation results not less than a certain value.

5. The system according to claim 1, wherein said assigning unit assigns comments to an entirety of the image or the region of the image based on a user instruction.

6. An information processing system comprising:
a processor coupled to a memory and programmed to function as:
an assigning unit that assigns a comment to a region of an image;

an evaluation unit that
rates each of a plurality of comments assigned to different regions of the image by said assigning unit based on contents of each of the plurality of comments, and
rates the image based on the rates of the plurality of comments; and
a display control unit that controls display of the image in relation to each of the plurality of comments,
wherein said assigning unit assigns, based on contents of the comment, an evaluation score to the comment using natural language processing in a case where the information processing system is in an automatic evaluation mode designated by a user instruction.

7. An information processing system comprising:
a processor coupled to a memory and programmed to function as:
an assigning unit that assigns a comment to a region of an image;
an evaluation unit that
rates each of a plurality of comments assigned to different regions of the image by said assigning unit based on contents of each of the plurality of comments, and
rates the image based on the rates of the plurality of comments; and
a display control unit that controls display of the image in relation to each of the plurality of comments,
wherein said evaluation unit weights an evaluation score of each of the plurality of comments based on position information indicating an assigned position of each of the plurality of comments, and evaluates the image based on the weighted evaluation scores.

8. An information processing system comprising:
a processor coupled to a memory and programmed to function as:
an assigning unit that assigns a comment to a region of an image;
an evaluation unit that
rates each of a plurality of comments assigned to different regions of the image by said assigning unit based on contents of each of the plurality of comments, and
rates the image based on the rates of the plurality of comments;
a display control unit that controls display of the image in relation to each of the plurality of comments; and
a recognition unit that recognizes a part of an object, to which each of the comments is assigned, by applying pattern recognition to the image,
wherein said evaluation unit weights an evaluation score of each of the plurality of comments according to each of the recognized parts.

9. An information processing apparatus comprising:
an assigning unit that assigns a comment to a region of an image;
an evaluation unit that
rates each of a plurality of comments assigned to different regions of the image by said assigning unit based on contents of each of the plurality of comments, and
rates the image based on the rates of the plurality of comments; and
a display control unit that controls display of the image in relation to each of the plurality of comments,
wherein at least one of said units is implemented by a processor executing computer-executable code stored in a non-transitory computer-readable memory.

10. A processing method of an information processing system, comprising steps of:
assigning a comment to a region of an image;
rating each of a plurality of comments assigned to different regions of the image in said assigning step based on contents of each of the plurality of comments;
rating the image based on the rates of the plurality of comments; and
controlling display of the image in relation to each of the plurality of comments, wherein at least one said steps is performed by a processor.

11. A non-transitory computer-readable storage medium storing a program that when executed causes a computer to perform a processing method of an information processing apparatus, the method comprising steps of:
assigning a comment to a region of an image;
rating each of a plurality of comments assigned to different regions of the image in said assigning step based on contents of each of the plurality of comments;
rating the image based on the rates of the plurality of comments; and
controlling display of the image in relation to each of the plurality of comments.

* * * * *